United States Patent
Adams

(10) Patent No.: US 9,351,167 B1
(45) Date of Patent: May 24, 2016

(54) SMS BOTNET DETECTION ON MOBILE DEVICES

(71) Applicant: Asurion, LLC, Nashville, TN (US)

(72) Inventor: Cory Adams, San Antonio, TX (US)

(73) Assignee: Asurion, LLC, Nashville, TN (US)

( * ) Notice: Subject to any disclaimer, the term of this patent is extended or adjusted under 35 U.S.C. 154(b) by 414 days.

(21) Appl. No.: 13/843,732

(22) Filed: Mar. 15, 2013

Related U.S. Application Data

(60) Provisional application No. 61/738,950, filed on Dec. 18, 2012.

(51) Int. Cl.
| | |
|---|---|
| *H04W 4/00* | (2009.01) |
| *H04M 1/66* | (2006.01) |
| *H04W 12/12* | (2009.01) |
| *H04W 4/14* | (2009.01) |
| *H04W 4/18* | (2009.01) |

(52) U.S. Cl.
CPC .............. *H04W 12/12* (2013.01); *H04W 4/14* (2013.01); *H04W 4/18* (2013.01)

(58) Field of Classification Search
CPC ......... H04W 4/003; H04W 4/12; H04W 4/14; H04W 4/20; H04W 4/26; H04W 88/184; H04W 88/02; H04W 4/18
See application file for complete search history.

(56) References Cited

U.S. PATENT DOCUMENTS

| | | | | |
|---|---|---|---|---|
| 8,387,141 | B1* | 2/2013 | Zhukov et al. | 726/22 |
| 2005/0222933 | A1* | 10/2005 | Wesby | G06Q 40/00 705/36 R |
| 2005/0278620 | A1* | 12/2005 | Baldwin | H04L 51/12 715/201 |
| 2006/0123083 | A1* | 6/2006 | Goutte | G06Q 10/107 709/206 |
| 2007/0254683 | A1* | 11/2007 | Jie | H04L 12/585 455/466 |
| 2008/0004049 | A1* | 1/2008 | Yigang | H04L 12/585 455/466 |
| 2008/0196104 | A1* | 8/2008 | Tuvell et al. | 726/24 |
| 2012/0110174 | A1* | 5/2012 | Wootton et al. | 709/224 |
| 2014/0004892 | A1* | 1/2014 | Murynets | H04W 4/14 455/466 |

* cited by examiner

*Primary Examiner* — San Htun
(74) *Attorney, Agent, or Firm* — Fish & Richardson P.C.

(57) ABSTRACT

Technologies for mobile device security are disclosed. A described technique includes launching a monitoring application that has a priority receiver attribute for a Short Message Service (SMS); receiving, within the monitoring application, a message from the SMS, the message being distributed to other applications on the mobile device; parsing the message to extract an originating address and message data; storing, in a data structure controlled by the monitoring application, the originating address and the message data; after a predetermined time interval, using the originating address and the message data stored in the data structure to determine whether the message has been stored in a non-priority client SMS database residing on the mobile device; and if the message has not been stored in the client SMS database, determining whether one or more applications other than the monitoring application that have the priority receiver attribute are associated with malicious activity.

19 Claims, 8 Drawing Sheets

SMS BOTNET DETECTION ON MOBILE DEVICES

CROSS REFERENCE TO RELATED APPLICATION

This patent document claims the benefit of the priority of U.S. Provisional Application Ser. No. 61/738,950, filed Dec. 18, 2012 and entitled "SMS BOTNET DETECTION ON MOBILE DEVICES," which is incorporated herein by reference in its entirety.

FIELD

This document generally relates to mobile device security.

BACKGROUND

Mobile devices (e.g., smartphones, tablet computers and the like) typically are implemented as special purpose computers that are powered by a mobile operating system ("OS"). The most common mobile operating systems used by modern smartphones include Google's Android, Apple's iOS, Nokia's Symbian, RIM's BlackBerry OS, Samsung's Bada, Microsoft's Windows Phone, Hewlett-Packard's webOS, and embedded Linux distributions such as Maemo and MeeGo. Such operating systems can be installed on many different phone models, and typically each device can receive multiple OS software updates over its lifetime.

Mobile device users often download additional software—for example, application programs (or "apps" for short)—for execution on their mobile devices to provide added functionality in the form of games, productivity apps, messaging apps, social networking apps and the like. Unfortunately, certain bad actors sometimes will hide harmful computer code—generally referred to as malware—in a software app that, outwardly to the mobile user, appears to be useful at best or innocuous at worst. In such a case, when a mobile user downloads and installs a piece of software containing malware onto his or her mobile device, the malware will attempt to take over control of the mobile device. In some cases, malware based applications can be downloaded without explicit user authorization. Moreover, some malware can be controlled via Short Message Service (SMS) based messages to launch an attack such as a distributed denial of service (DDOS) attack or to extract confidential, sensitive or financial information and use it for purposes of fraud, theft, or other nefarious ends.

SUMMARY

This document describes, among other things, technologies relating to mobile device security. In one aspect, a described technique includes launching a monitoring application that has a priority receiver attribute for a SMS; receiving, within the monitoring application, a message from the SMS, the message being distributed to one or more applications on the mobile device; parsing the message to extract an originating address and message data; storing, in a data structure controlled by the monitoring application, the originating address and the message data; after a predetermined time interval, using the originating address and the message data stored in the data structure to determine whether the message has been stored in a client SMS database residing on the mobile device, the client SMS database being associated with a process lacking the priority receiver attribute for SMS; and if the message has not been stored in the client SMS database, identifying, other than the monitoring application, one or more applications that have the priority receiver attribute for SMS; and determining whether the one or more identified applications are associated with malicious activity.

The above and other implementations can include one or more of the following features. Implementations can include accessing a set of one or more addresses associated with known malicious activity; determining whether the originating address is present in the set; and if the message has been stored in the client SMS database and the originating address is associated with known malicious activity, determining whether one or more applications other than the monitoring application are associated with malicious activity. Determining whether the one or more identified applications are associated with malicious activity can include sending profile information associated with the message to a server system that is configured to analyze the profile information for malicious activity. The profile information can include one or more application names that correspond respectively to the one or more applications. Identifying the one or more applications can include excluding one or more system applications. Identifying the one or more applications can include excluding one or more applications that are on a whitelist.

A mobile device can include a memory structure that is configured to store information comprising instructions for a monitoring application that has a priority receiver attribute for SMS; and a processor configured to perform operations. The operations can include receiving, within the monitoring application, a message from the SMS, the message being distributed to one or more applications on the mobile device; parsing the message to extract an originating address and message data; storing, in a data structure controlled by the monitoring application, the extracted originating address and the message data; after a predetermined time interval, using the originating address and the message data stored in the data structure to determine whether the message has been stored in a client SMS database residing on the mobile device, the client SMS database being associated with a process lacking the priority receiver attribute for SMS; if the message has not been stored in the client SMS database, identifying, other than the monitoring application, one or more applications that have the priority receiver attribute for SMS; and determining whether the one or more identified applications are associated with malicious activity.

A system can include an analysis server configured to receive from mobile devices information associated with potential SMS attack messages and configured to analyze the information for malicious activity; and a mobile device configured to perform operations. The operations can include receiving a SMS message within a monitoring application that has a priority receiver attribute for SMS, the message being distributed to one or more applications on the mobile device; parsing the message to extract an originating address and message data; storing, in a data structure controlled by the monitoring application, the extracted originating address and the message data; after a predetermined time interval, using the originating address and the message data stored in the data structure to determine whether the message has been stored in a client SMS database residing on the mobile device, the client SMS database being associated with a process lacking the priority receiver attribute for SMS; if the message has not been stored in the client SMS database, identifying, other than the monitoring application, one or more applications that have the priority receiver attribute for SMS; and sending the analysis server information comprising a list of the one or more identified applications.

The above and other implementations can include one or more of the following features. The operations can include accessing a set of one or more addresses associated with known malicious activity; determining whether the originating address is present in the set; if the message has been stored in the client SMS database and the originating address is associated with known malicious activity, generating a list of one or more applications other than the monitoring application that are configured to receive SMS messages; and sending the analysis server information comprising the generated list. In some implementations, the analysis server is configured to provide the set of one or more addresses associated with known malicious activity. Sending the analysis server informing can include sending profile information associated with the message, and where the analysis server can be configured to analyze the profile information for malicious activity. Profile information can include one or more application names that correspond respectively to the one or more applications. Identifying the one or more applications can include excluding one or more system applications. Identifying the one or more applications can include excluding one or more applications that are on a whitelist.

Particular embodiments of the technology described in this document can be implemented so as to realize one or more of the following potential advantages. The techniques described here may be implemented to help detect malware running on mobile devices, for example, by detecting when a malware application erases a command and control (C2) based SMS message. Leveraging on-device capabilities for performing said detecting can reduce the number of candidate applications that are passed to an analysis server for additional malware analysis. Moreover, reducing the number of candidate applications that are passed can decrease the time between infection and detection.

Details of one or more embodiments of the subject matter described in this document are set forth in the accompanying drawings and the description below. Other features, aspects, and potential advantages of the subject matter will become apparent from the description, the drawings, and the claims.

BRIEF DESCRIPTION OF THE DRAWINGS

Like reference symbols in the various drawings indicate like elements.

DETAILED DESCRIPTION

Malware servers and malware client applications executing on mobile devices and can use SMS communications for sending and receiving command and control (C2) messages. Malware-infected devices can be organized into a botnet and controlled by an attacker's C2 server. This disclosure describes, among other things, techniques that leverage on-device capabilities that can decrease the time required to detect and treat malicious applications. A mobile device can be configured to report application attributes, such as application name and/or data, to a server system for further analysis. However, reporting too many applications can slow down analysis. The described techniques can limit the scope of applications for analysis by using on-device capabilities to detect when an application conceals a reception of a SMS message such that other applications, including those that make SMS messages appear to a mobile device user, never receive the SMS message. By limiting the scope of analysis, the time between infection and detection can decrease, thereby mitigating the malware's impact.

Figure 1A:
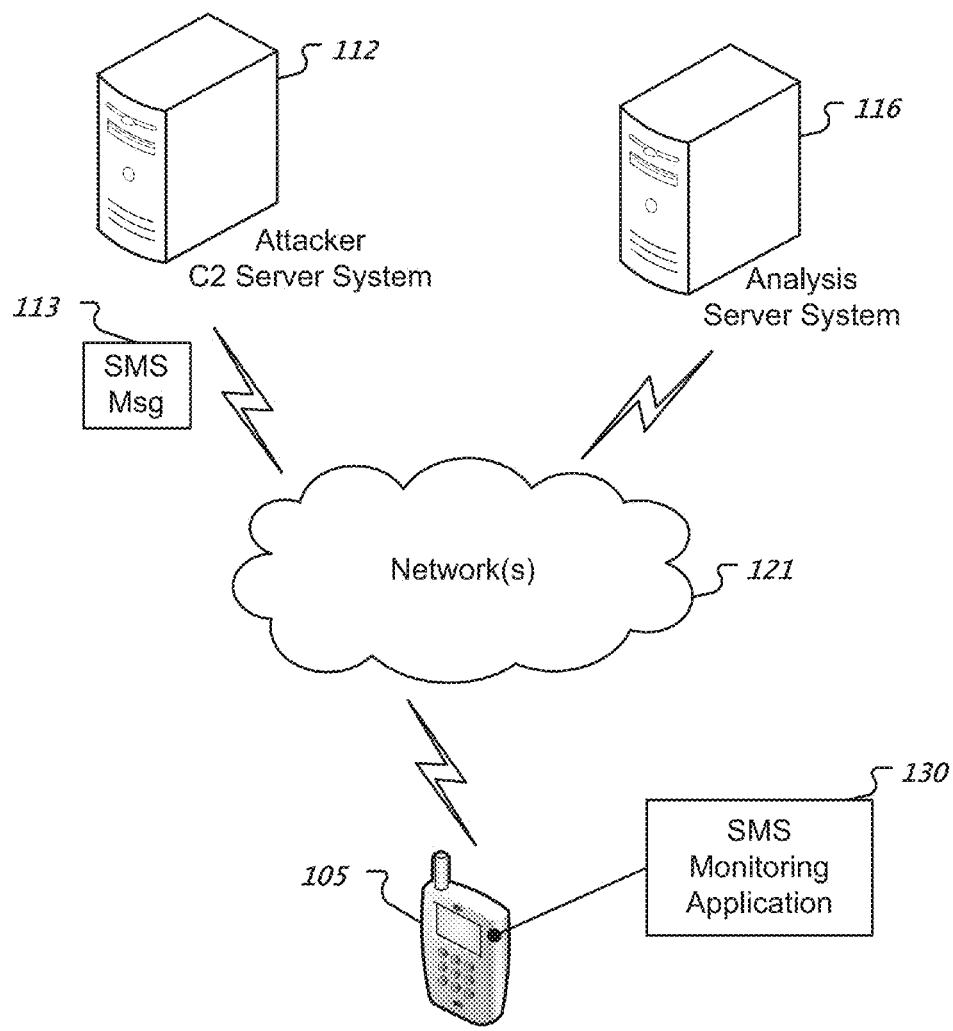
FIG. 1A shows a diagram of an example of a wireless communication system and attacker system.

FIG. 1A shows a diagram of an example of a wireless communication system and attacker system. A mobile device 105 is configured to communicate with a network 121 which can include or couple with one or more wireless networks and wired networks, including the Internet. An attacker C2 server system 112 can send a SMS message 113 to a device, such as device 105, which can be infected with a malware application that is responsive to such a message 113. The message 113 can trigger the device 105 to start an attack such as a DDOS attack or to extract confidential, sensitive or financial information and use it for purposes of fraud, theft, or other nefarious ends. In this example, the device 105 includes a SMS monitoring application 130 to monitor incoming SMS messages for malicious behaviors. Further, the device 105 can be configured to send suspicious messages to an analysis server system 116 for further processing. The attacker C2 server system 112 can include one or more servers. The analysis server system 116 can include one or more servers.

Figure 1B:
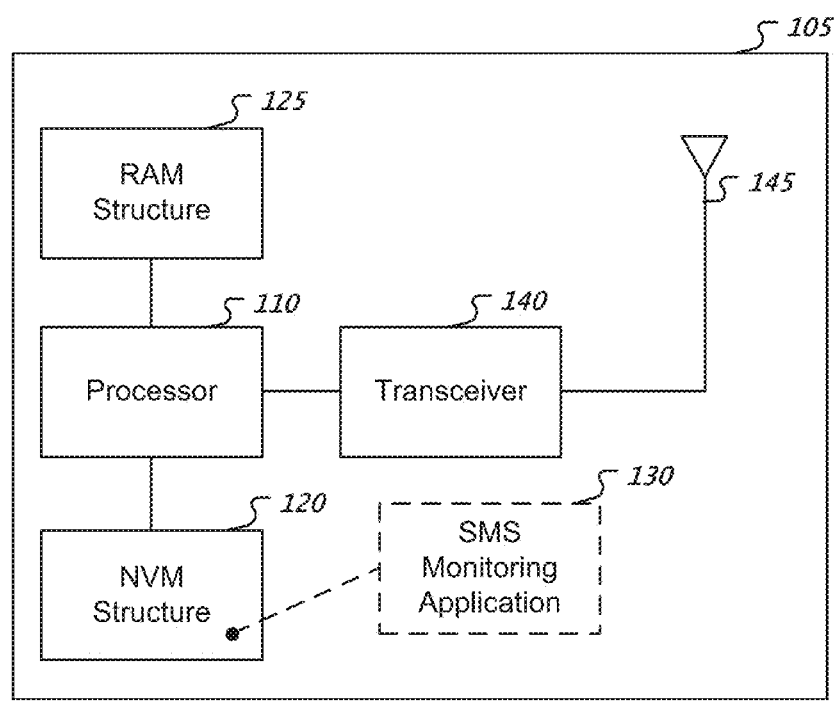
FIG. 1B shows a simplified architecture of an example of a mobile device that includes a SMS monitoring application.

FIG. 1B shows a simplified architecture of an example of a mobile device 105 that includes a SMS monitoring application 130. The mobile device 105 includes a processor 110, a transceiver 140, an antenna 145, a non-volatile memory (NVM) structure 120, and a random-access memory (RAM) structure 125. The NVM structure 120 stores software such as a mobile device OS and application software. The processor 110 can load software from the NVM structure 120 into the RAM structure 125, and can start to execute the software from the RAM structure 125. In some implementations, the processor 110 directly executes software from the NVM structure 120. In some implementations, the processor 110 includes multiple processor cores.

The mobile device 105 can send and receive data packets over one or more wireless interfaces. For example, the mobile device's processor 110 can send and receive data packets via a transceiver 140 and an antenna 145. Various examples of wireless interface technology include interfaces based on Long Term Evolution (LTE), Global System for Mobile Communications (GSM), IEEE 802.11a/b/g/n/ac, and Code Division Multiple Access (CDMA) technologies such as CDMA2000 and WCDMA. Other types of wireless interface technologies are possible. In some implementations, the mobile device 105 can include multiple antennas 145, multiple transceivers 140, or both. The mobile device 105 can download application software over one or more of these wireless interfaces and store the application software on a memory structure such as the NVM structure 120 or the RAM structure 125.

The flexibility to download any application software can be exploited to introduce malware and other potentially unwanted programs onto the mobile device 105, which often brings undesirable consequences. Moreover, the ability to communicate with network endpoints can open up the mobile device 105 for exploitation, e.g., remote exploits. For example, the attacker C2 server system 112 can send an attack command via a SMS messages 113 that can triggers an on-device malware application to start an attack. To counter this, the mobile device 105 includes a SMS monitoring application 130. The SMS monitoring application 130 can monitor SMS message handling by applications residing on the mobile device 105 to detect malicious activity, e.g., an application trying to conceal a C2 related SMS message 113. The SMS monitoring application 130 can be configured to kill malicious processes. The SMS monitoring application 130 can be installed by a user. In some implementations, the application 130 can be loaded into the device 105 during a manufacturing process. In some implementations, the application 130 can be downloaded and installed on the device 105 from an application server.

The mobile device 105 can be configured to allow one or more SMS receiver applications to register with the device's SMS framework. In some implementations, the SMS framework forms a chain of SMS receiver applications, placing applications with a priority receiver attribute ahead of applications that lack such an attribute. If multiple applications have the priority receiver attribute, an installation or registration order can control the position of an application on the chain. Once a SMS message is received, the SMS framework can serially distribute the SMS message to applications on the chain. An application may "abort" the SMS message by sending an abort signal to the SMS framework, which will cause the SMS framework to cease distributing the SMS message to any remaining applications on the chain.

Figure 2:
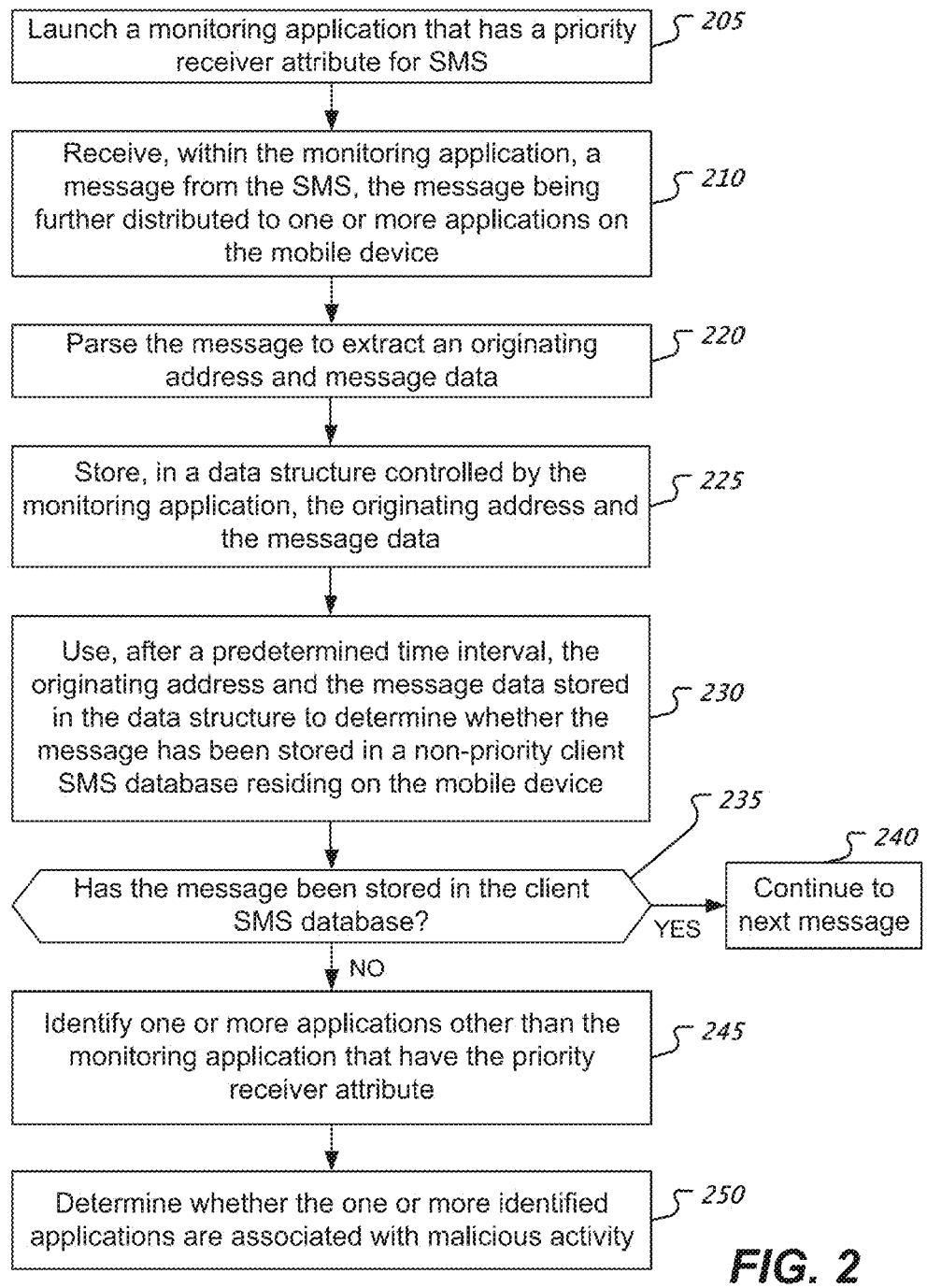
FIG. 2 shows a flowchart of an example of a security procedure performed by a mobile device.

FIG. 2 shows a flowchart of an example of a security procedure performed by a mobile device. At 205, the mobile device launches a monitoring application that has a priority receiver attribute for SMS. In some implementations, the device is configured to automatically launch the monitoring application upon device start-up. At 210, the device receives, within the monitoring application, a message from the SMS, the message being further distributed to one or more applications on the mobile device. At 220, the device parses the message to extract an originating address and message data. Various examples of an originating address include a telephone number, e-mail address, or a SMS short-code number. Other types of addresses are possible. At 225, the device stores, in a data structure controlled by the monitoring application, the originating address and the message data. In some implementations, a data structure can be referred to as a database. In some implementations, a database can include one or more data arrays.

At 230, the device uses, after a predetermined time interval, e.g., 1, 2, or 5 seconds, the originating address and the message data stored in the data structure to determine whether the message has been stored in a non-priority client SMS database residing on the mobile device. In some implementations, the value for the predetermined time interval is specified by a configuration file. The non-priority client SMS database can be associated with a process lacking the priority receiver attribute for SMS. In some implementations, a non-priority client SMS database is managed by a native SMS client.

If at 235, the message has been store in the client SMS database, the monitoring application, at 240, can continue to the next message. In some implementations, the monitoring application performs a secondary analysis. If no threat is detected, the stored originating address and message can be deleted from the data structure controlled by the monitoring application.

If at 235, the message has not been store in the client SMS database, the monitoring application, at 245, the device identifies one or more applications other than the monitoring application that have the priority receiver attribute. The identifying at 245 can include excluding one or more applications that are on a whitelist. In some implementations, a whitelist can include one or more system applications and/or non-system applications that should be excluded as potential malware application candidates. The identifying at 245 can include excluding one or more system applications. At 250, the device determines whether the one or more identified applications are associated with malicious activity. The determining at 250 can include sending profile information associated with the message to a server system that is configured to analyze the profile information for malicious activity. The profile information can include one or more application names that correspond respectively to the one or more identified applications.

Figure 3:
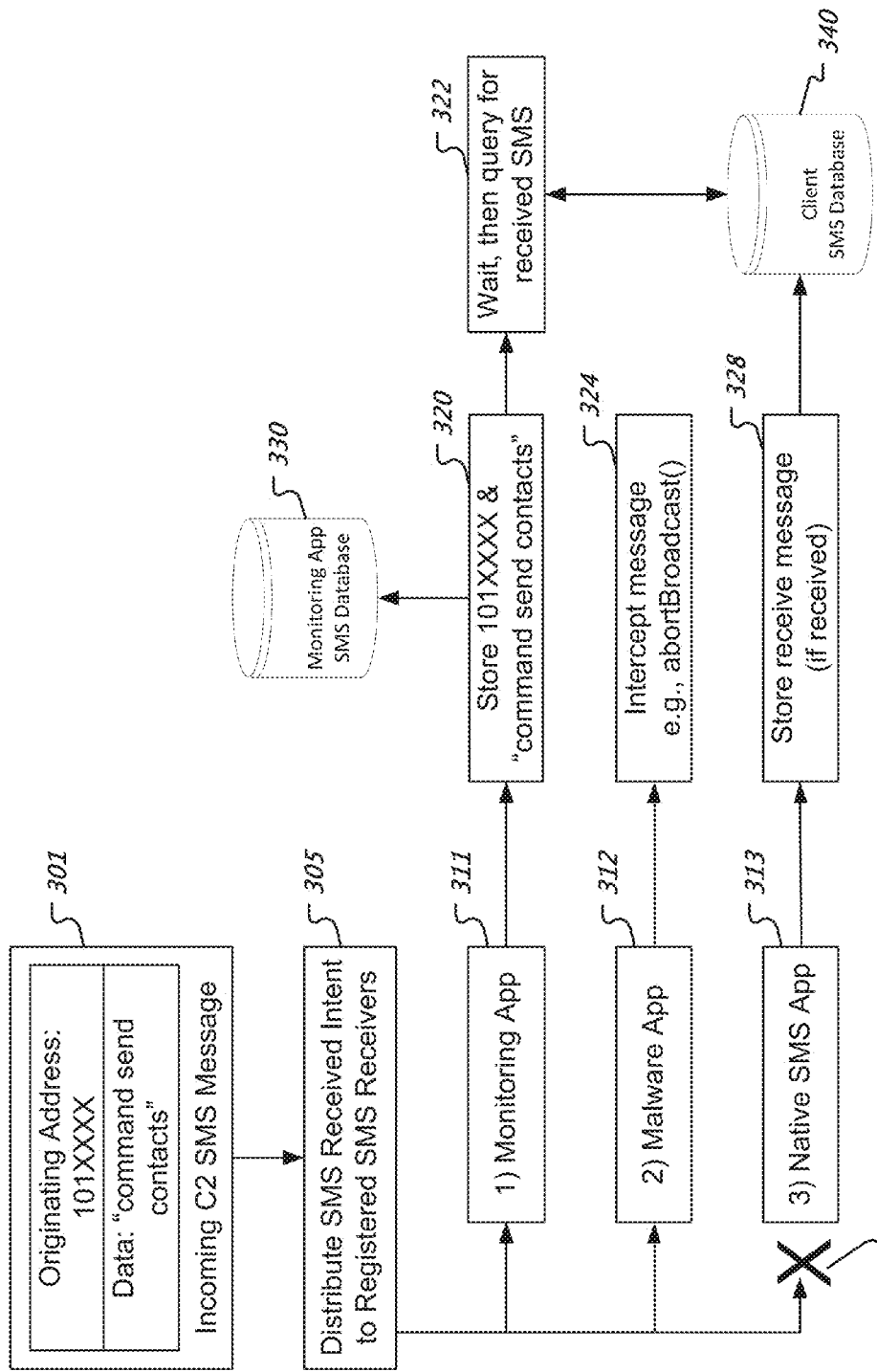
FIG. 3 shows an operational overview of an example of handling an incoming C2 SMS message on a mobile device.

FIG. 3 shows an operational overview of an example of handling an incoming C2 SMS message on a mobile device. In this example, an attacker C2 server sends a malware infected mobile device a C2 SMS message 301. The mobile device is configured, at 305, to distributed a SMS received intent to registered SMS receivers. The registered SMS receivers include a SMS monitoring application 311, a malware application 312, and a native SMS application 313. At 320, the monitoring application 311 stores the message 301 in its private data structure, e.g., monitoring application SMS database 330. Further, the native SMS application 313 is configured, at 328, to store messages to its client SMS database 340 based on receiving messages from the distribution procedure at 305.

A malware application 312 on the mobile device intercepts the message 301 at 324 to prevent the message 301 from reaching any additional applications (see "X" at 326). The malware application 312 aborts the C2 SMS message 301 to try to conceal the message, e.g., sends a message abort command by calling abortBroadcast( ). As depicted, the native SMS application 313 is last on the list of registered SMS receivers. Thus, any preceding application that sends a message abort command (such as the malware application 312) will cause the distribution procedure at 305 to cease distributing the message 301, which will prevent the native SMS application 313 from receiving the message 301, and accordingly, the native SMS application 313 will not record the message 301 in its client SMS database 340.

Since the monitoring application 311 has already noted receipt of the message 301 in its private data structure such as its database 330, the monitoring application 311 will be able to detect the effect of a message abort command. At 322, after waiting for a predetermined period of time, the monitoring application 311 will query the client SMS database 340 via the native SMS application 313. The query can include the originating address and the data payload of the message 301 as stored by the monitoring application 311 at 320. In some cases, the monitoring application 311 may not be able to identify the specific application that sent the message abort command, nonetheless, the monitoring application 311 can identify one or more applications that could have sent the message abort command. Information about the SMS message 301 and one or more identified applications can be sent to an analysis server system. The analysis server system can compile information about malware threats and information mobile devices about such threats using information received from mobile devices and other sources.

A SMS monitoring application can leverage several aspects of the mobile operating system to identify malicious applications using SMS messaging as a communication technique method between attacker server and infected device. The SMS monitoring application can be installed on a mobile device. When the application is launched, it can register a priority broadcast receiver listening for incoming SMS messages. When an incoming SMS message is received, the application parses the protocol description units (PDUs) for the originating address (e.g., the number that sent the SMS) and the data (e.g., message content) and stores the contents. The application will then sleep/wait a predetermined period of time before querying the native SMS database. The application queries the native SMS database for the contents of the last received message (e.g., originating address and data) to determine if the native SMS client ever received and stored the contents in the native SMS database. The results of this query leads to two paths, A-Path and B-Path.

In the A-Path, message content is not in the native SMS database. If the content is not in the native SMS database, then an abortBroadcast( ) was called by an application with a SMS receiver that had a priority higher than the native SMS receiver. To identify the possible malicious application on the device, the monitoring application can parse application configuration files, such as AndroidManifest.xml files, on the device to identify priority SMS receivers. From the list of priority SMS receivers, the monitoring application can filter out system applications and the monitoring application itself. The remaining applications with priority SMS receivers are then sent to an analysis server to conduct further analysis. In some implementations, the analysis server is provided via a cloud-based analysis service. In some implementations, analysis can also be done on-device if the cloud analysis environment is inaccessible.

In the B-Path, message content is in the native SMS database. If the content is in the native SMS database, then the application can compare the originating address against a list of known C2 SMS numbers. If the originating address is a known C2 SMS number, then the monitoring application can parse the application configuration files on the device to identify SMS receivers. From the list of SMS receivers, the monitoring application can filter out system applications and the monitoring application itself. The remaining applications with SMS receivers are then sent to an analysis server to conduct further analysis. In some implementations, the analysis server is provided via a cloud-based analysis service. In some implementations, analysis can also be done on-device if the cloud-based analysis environment is inaccessible.

Figure 4A:
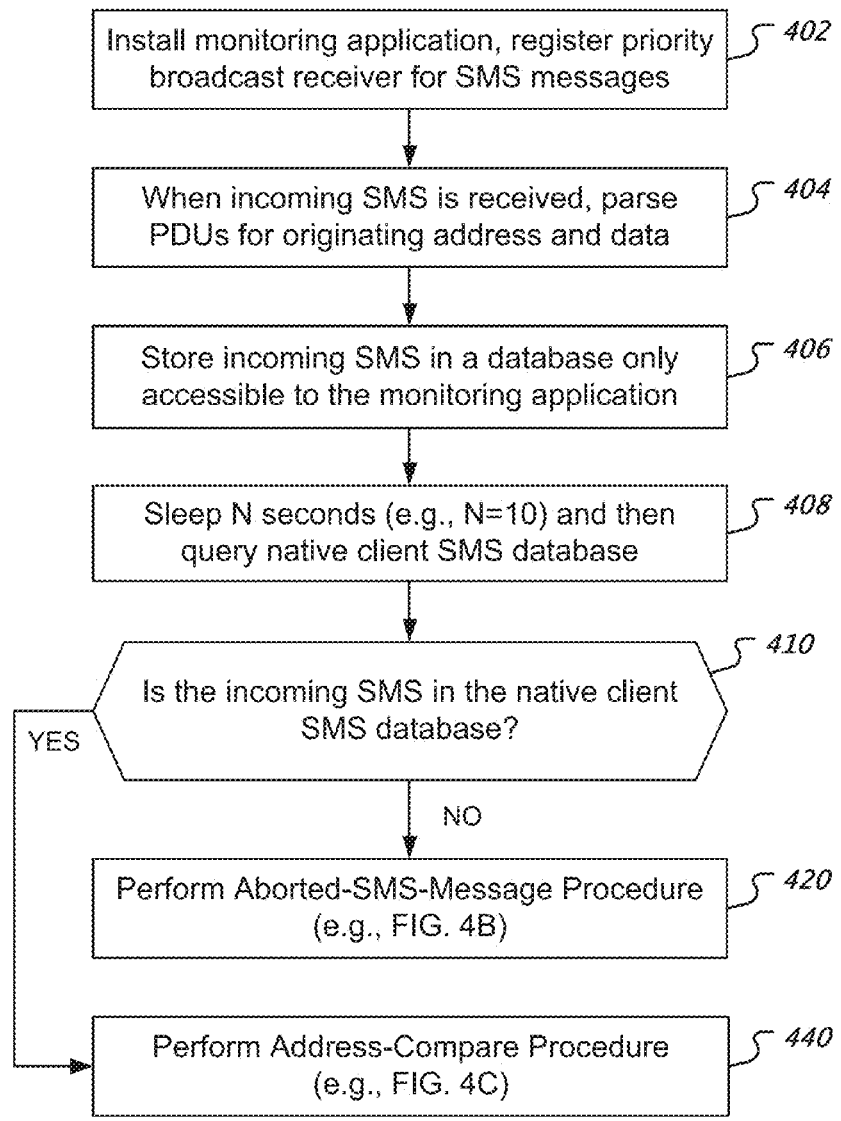
FIGS. 4A, 4B, and 4C show flowcharts associated with another example of a security procedure performed by a mobile device.
Figure 4B:
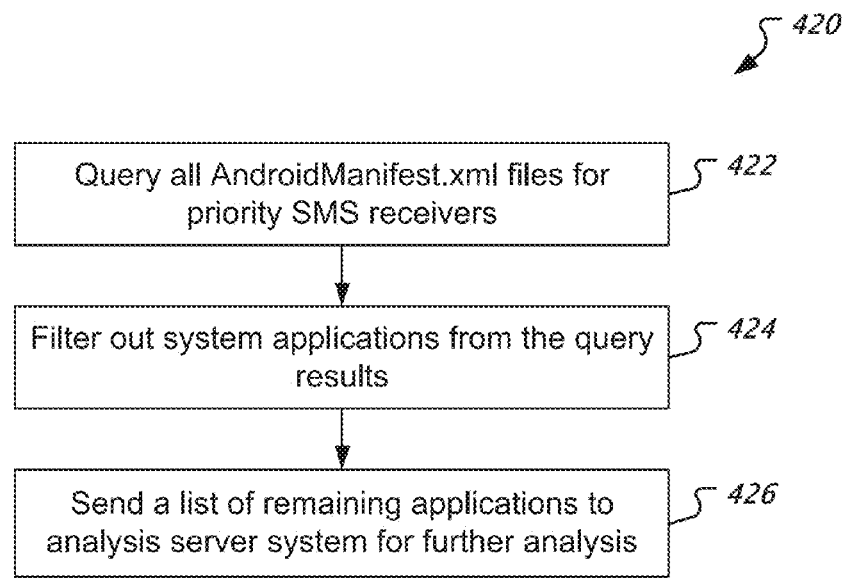
Figure 4C:
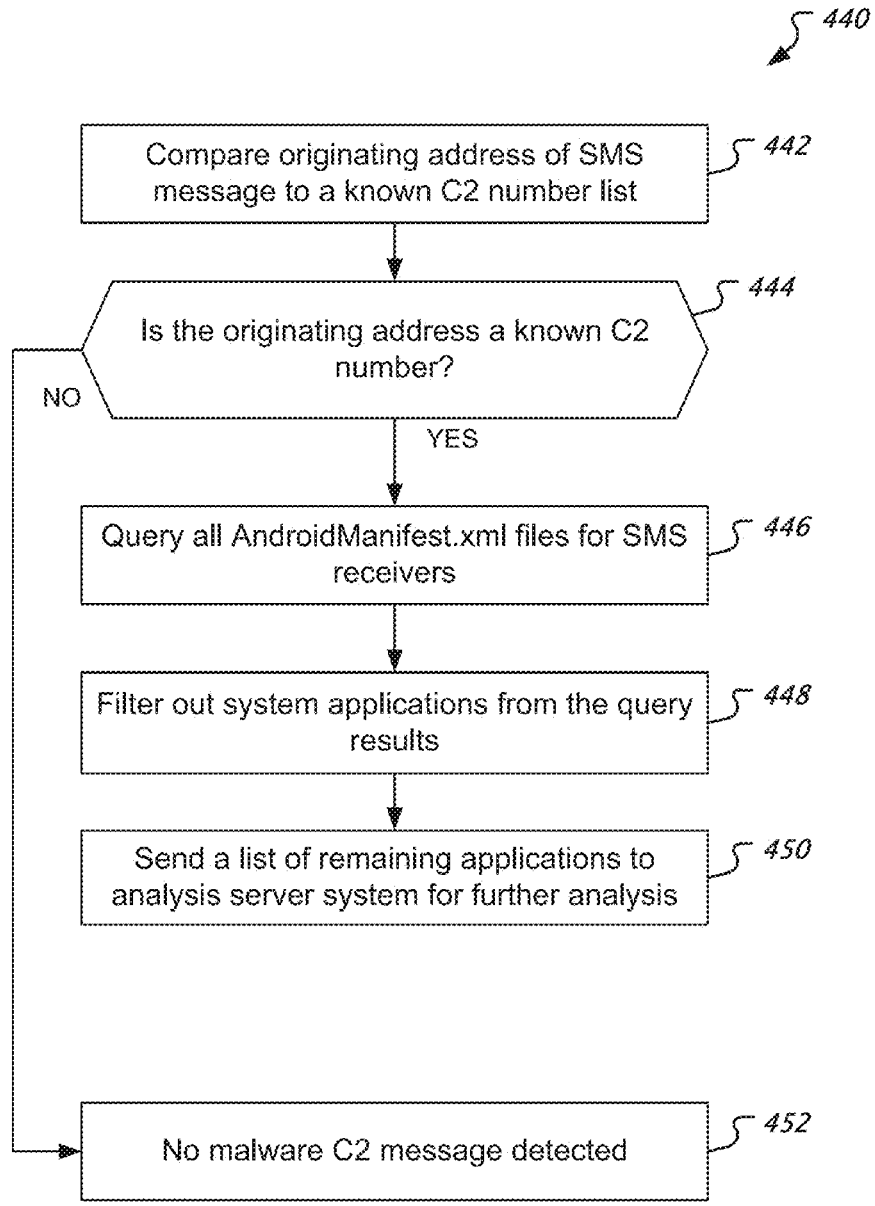

FIGS. 4A, 4B, and 4C show flowcharts associated with another example of a security procedure performed by a mobile device. FIG. 4A shows a flowchart of a procedure for handling an incoming SMS message. At 402, the procedure installs the monitoring application and registers it as a priority broadcast receiver for SMS messages. The installation of the monitoring application can be performed once, and need not be repeated. Installing the monitoring application can include configuring the mobile device to launch the monitoring application at start-up. In some implementations, installing the monitoring application can include installing a service handling routine that invokes the monitoring application in response to receiving a SMS message. At 404, the procedure, in response to receiving an incoming SMS message, parses PDUs for originating address and data. At 406, the procedure stores the incoming SMS message in a database only accessible to the monitoring application. At 408, the procedure sleeps N seconds (e.g., N=1, 2, 5, or 10) and then queries the native client SMS database. At 410, the procedure determines whether the incoming SMS is in the native client SMS database. If the incoming SMS is not in the native client SMS database, then the procedure performs an aborted-SMS-message procedure 420, see, for example, FIG. 4B. If the incoming SMS is in the native client SMS database, then the procedure performs an address-compare procedure 440, see, for example, FIG. 4C.

FIG. 4B shows a flowchart of an example of an aborted-SMS-message procedure 420. At 422, the procedure 420 queries all AndroidManifest.xml files for priority SMS receivers. At 424, the procedure 420 filters out system applications from the query results. At 426, the procedure 420 sends a list of remaining applications to analysis server system for further analysis.

FIG. 4C shows a flowchart of an example of an address-compare procedure 440. At 442, the procedure 440 compares originating address of the SMS message to a known C2 number list. At 444, the procedure 440 determines whether the originating address is a known C2 number. If it is not a known C2 number, then at 452, the procedure 440 decided that no malware C2 message has been detected. If it is a known C2 number, then at 446, the procedure 440 queries all AndroidManifest.xml files for SMS receivers. At 448, the procedure 440 filters out system applications from the query results. At 450, the procedure 440 sends a list of remaining applications to analysis server system for further analysis. In some implementations, the analysis server system provides the known C2 number list to the mobile device.

Figure 5:
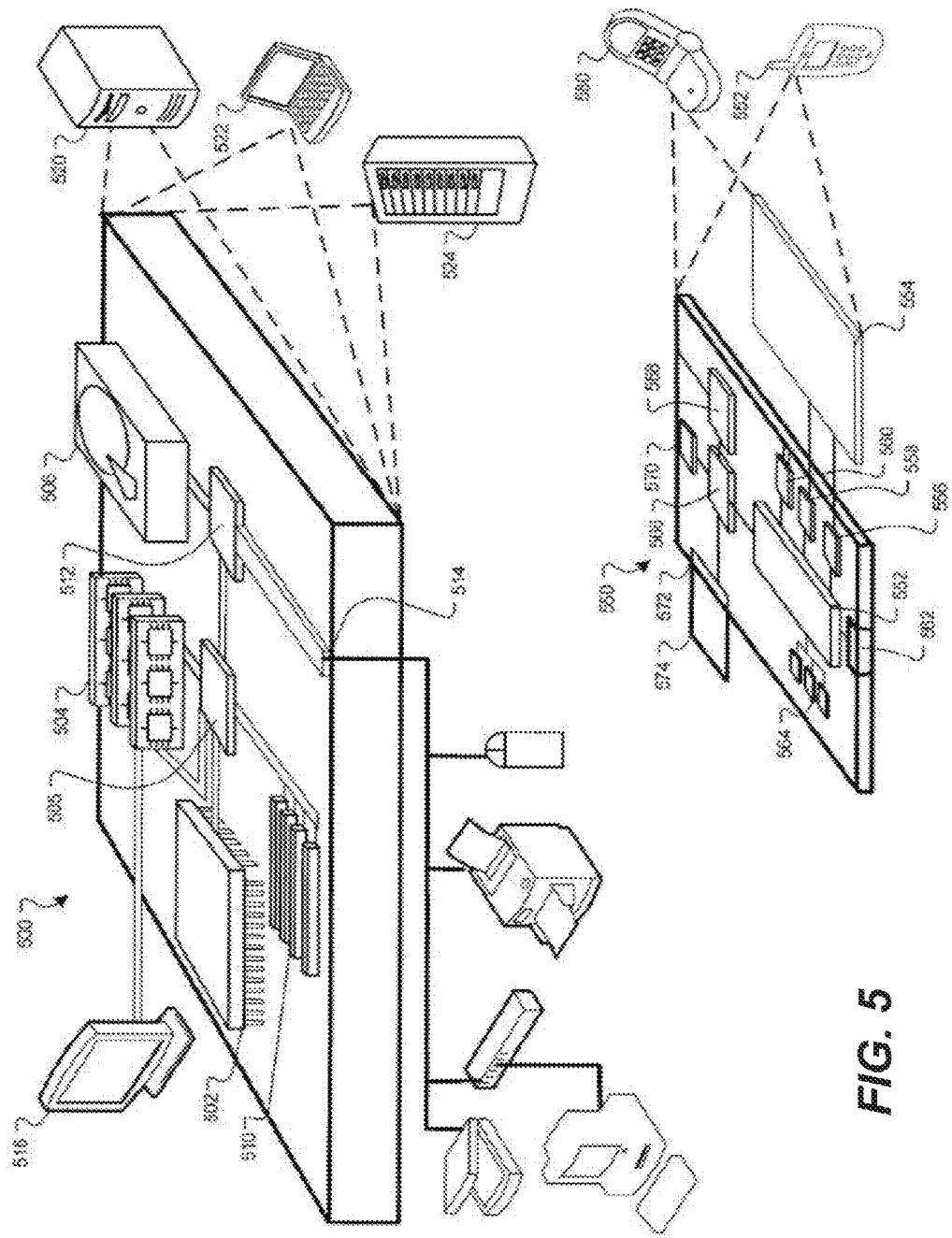
FIG. 5 shows a block diagram of computing devices that may be used to implement the systems and methods described in this document.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers and/or mobile devices. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the technologies described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for detecting impersonation on a social network may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by a mobile device, the method comprising:
   launching a monitoring application that has a priority receiver attribute for a Short Message Service (SMS), the mobile device being configured to receive a message from the SMS and distribute the message to a group of applications including (i) the monitoring application and (ii) a native application that lacks the priority receiver attribute for SMS;
   receiving, within the monitoring application, the message from the SMS;
   parsing the message to extract an originating address and message data;
   storing, in a data structure controlled by the monitoring application, the extracted originating address and the message data;
   detecting whether an application of the group of applications has intercepted the message to prevent at least the native application from receiving the message, wherein the detecting comprises after a predetermined time interval, using the originating address and the message data stored in the data structure to determine whether the message has been stored in a client SMS database residing on the mobile device, the client SMS database being associated with the native application, wherein using the originating address and the message data stored in the data structure comprises querying the client SMS database to determine whether the message was stored in the client SMS database;
   if the message has not been stored in the client SMS database, identifying, other than the monitoring application, one or more applications that have the priority receiver attribute for SMS; and
   determining whether the one or more identified applications are associated with malicious activity.

2. The method of claim 1, comprising:
   accessing a set of one or more addresses associated with known malicious activity;
   determining whether the originating address is present in the set; and
   if the message has been stored in the client SMS database and the originating address is associated with known malicious activity, determining whether one or more applications other than the monitoring application are associated with malicious activity.

3. The method of claim 1, wherein determining whether the one or more identified applications are associated with malicious activity comprises:
   sending profile information associated with the message to a server system that is configured to analyze the profile information for malicious activity.

4. The method of claim 3, wherein the profile information comprises one or more application names that correspond respectively to the one or more applications.

5. The method of claim 1, wherein identifying the one or more applications comprises excluding one or more system applications.

6. The method of claim 1, wherein identifying the one or more applications comprises excluding one or more applications that are on a whitelist.

7. A mobile device comprising:
a memory structure that is configured to store information comprising instructions for a monitoring application that has a priority receiver attribute for a Short Message Service (SMS);
a transceiver configured to send and receive data, the transceiver being configured to receive a message via the SMS; and
a processor coupled with the memory structure and the transceiver, the processor being configured to receive a message from the SMS and distribute the message to a group of applications including (i) the monitoring application and (ii) a native application that lacks the priority receiver attribute for SMS, the processor being configured to perform operations comprising:
receiving, within the monitoring application, the message;
parsing the message to extract an originating address and message data;
storing, in a data structure controlled by the monitoring application, the extracted originating address and the message data;
detecting whether an application of the group of applications has intercepted the message to prevent at least the native application from receiving the message, wherein the detecting comprises after a predetermined time interval, using the originating address and the message data stored in the data structure to determine whether the message has been stored in a client SMS database residing on the mobile device, the client SMS database being associated with the native application, wherein using the originating address and the message data stored in the data structure comprises querying the client SMS database to determine whether the message was stored in the client SMS database;
if the message has not been stored in the client SMS database, identifying, other than the monitoring application, one or more applications that have the priority receiver attribute for SMS; and
determining whether the one or more identified applications are associated with malicious activity.

8. The device of claim 7, wherein the operations comprise:
accessing a set of one or more addresses associated with known malicious activity;
determining whether the originating address is present in the set; and
if the message has been stored in the client SMS database and the originating address is associated with known malicious activity, determining whether one or more applications other than the monitoring application are associated with malicious activity.

9. The device of claim 7, wherein determining whether the one or more identified applications are associated with malicious activity comprises:
causing the transceiver to send profile information associated with the message to a server system that is configured to analyze the profile information for malicious activity.

10. The device of claim 9, wherein the profile information comprises one or more application names that correspond respectively to the one or more applications.

11. The device of claim 7, wherein identifying the one or more applications comprises excluding one or more system applications.

12. The device of claim 7, wherein identifying the one or more applications comprises excluding one or more applications that are on a whitelist.

13. A system comprising:
an analysis server configured to receive from mobile devices information associated with potential Short Message Service (SMS) attack messages and configured to analyze the information for malicious activity; and
a mobile device configured to receive a SMS message and distribute the SMS message to a group of applications including (i) a monitoring application that has a priority receiver attribute for SMS and (ii) a native application that lacks the priority receiver attribute for SMS, wherein the mobile device is configured to perform operations comprising:
receiving the SMS message within the monitoring application;
parsing the message to extract an originating address and message data;
storing, in a data structure controlled by the monitoring application, the extracted originating address and the message data;
detecting whether an application of the group of applications has intercepted the SMS message to prevent at least the native application from receiving the SMS message, wherein the detecting comprises (i) after a predetermined time interval from a reception of the SMS message, using the originating address and the message data stored in the data structure to determine whether the message has been stored in a client SMS database residing on the mobile device, the client SMS database being associated with the native application and (ii) when the message has not been stored in the client SMS database, identifying, other than the monitoring application, one or more applications of the group of applications that have the priority receiver attribute for SMS, wherein using the originating address and the message data stored in the data structure comprises querying the client SMS database via the native application to determine whether the SMS message was stored in the client SMS database; and
sending the analysis server information comprising a list of the one or more identified applications.

14. The system of claim 13, wherein the operations comprise:
accessing a set of one or more addresses associated with known malicious activity;
determining whether the originating address is present in the set;
if the message has been stored in the client SMS database and the originating address is associated with known malicious activity, generating a list of one or more applications other than the monitoring application that are configured to receive SMS messages; and
sending the analysis server information comprising the generated list.

15. The system of claim 14, wherein the analysis server is configured to provide the set of one or more addresses associated with known malicious activity.

16. The system of claim 13, wherein sending the analysis server informing comprises sending profile information associated with the message, and wherein the analysis server is configured to analyze the profile information for malicious activity.

17. The system of claim 16, wherein the profile information comprises one or more application names that correspond respectively to the one or more applications.

18. The system of claim 13, wherein identifying the one or more applications comprises excluding one or more system applications.

19. The system of claim 13, wherein identifying the one or more applications comprises excluding one or more applications that are on a whitelist.

* * * * *